United States Patent [19]

Klocke

[11] Patent Number: 4,567,913

[45] Date of Patent: Feb. 4, 1986

[54] SWITCHING MECHANISMS FOR PREPARING CONTROL SIGNALS

[75] Inventor: Harald Klocke, Malente, Fed. Rep. of Germany

[73] Assignee: H. Kuhnke GmbH KG., Malente, Fed. Rep. of Germany

[21] Appl. No.: 672,295

[22] Filed: Nov. 16, 1984

Related U.S. Application Data

[63] Continuation-in-part of Ser. No. 553,864, Nov. 21, 1983, abandoned.

[30] Foreign Application Priority Data

Jul. 12, 1980 [DE] Fed. Rep. of Germany ....... 3026539

[51] Int. Cl.[4] .............................................. G05D 16/20

[52] U.S. Cl. ............................ 137/624.11; 137/625.64

[58] Field of Search ....................... 137/624.11, 624.12, 137/624.18, 624.2, 625.64

[56] References Cited

U.S. PATENT DOCUMENTS 3,931,832 1/1976 Holder .......................... 137/624.11

4,288,966 9/1981 Aten ............................ 137/624.2 X 4,345,610 8/1982 Herter .......................... 137/624.2 X

*Primary Examiner*—Alan Cohan

*Attorney, Agent, or Firm*—Balogh, Osann, Kramer, Dvorak, Genova & Traub

[57] ABSTRACT

A switching mechanism for preparing fluidic output signals of the kind comprising a first transformer acted upon by fluidic input signals which is connected in circuit in front of an electrical system which makes the converted signals available in the form of a control signal after expiration of a period presettable on said system, or of an event value. According to the invention, the electrical system comprises a combined switchable clock mechanism which is formed by a time function element (which is known per se) of the transistor or quartz type, and by a counter element (also known per se). The clock mechanism has post-connected to it a monostable multivibrator which has again connected to it a value means comprising a storage which may be activated by the transient control signal of the sweep stage for conversion of the electrical control signal of the clock mechanism into a fluidic output signal.

7 Claims, 4 Drawing Figures

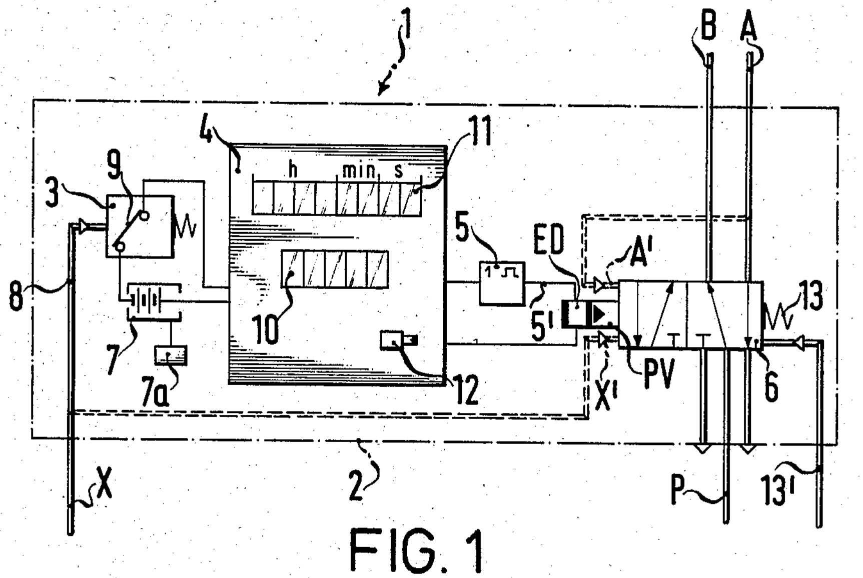
FIG. 1
FIG. 2
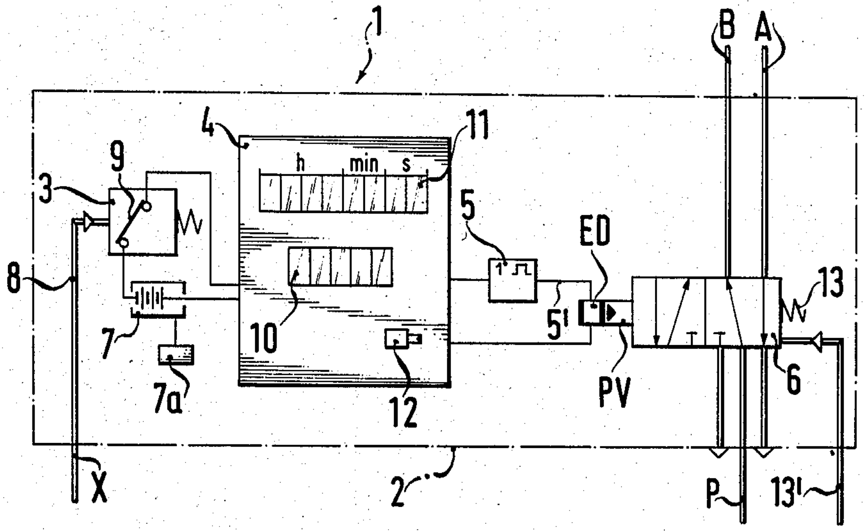

SWITCHING MECHANISMS FOR PREPARING CONTROL SIGNALS

This application is a continuation-in-part of application Ser. No. 553,864, filed Nov. 21, 1984 and now abandoned.

BACKGROUND OF THE INVENTION

The present invention relates to switching mechanisms for preparing fluidic output signals, in which a first converter or transformer acted upon by fluidic input signals is connected in circuit in front of an electrical system which makes the converted signals available after expiration of a time interval presettable on said system, or of an event value, in the form of a control signal.

In preparing control signals under the application of fluidic input signals, it is known to convert the fluidic input signal into an electrical signal and thereupon to feed the latter to a time function element which, in accordance with the preselected time interval, makes an electrical output signal available as a control signal. The latter may then, for example, be fed to the electromagnetic valve of a fluidic switching circuit which is to be controlled. For more protracted periods, e.g., several minutes or hours, time function elements of this nature comprise mechanical retarding mechanisms or systems operated by centrifugal force. For shorter periods, it is known that a component operating in accordance with the inductance-capacitance principle may be utilized as a time function element. Time function elements of this kind have the disadvantage that, apart from considerable mechanical complexity, they do not work with precise timing, that is to say, in respect of the onset as well as of the duration of the period required in each case. This also applies regarding the reproducibility of the timing settings. These time function elements are moreover affected by hysteresis and parallax.

time function elements of the transistor or quartz type are installed, for example, in radio apparatus or in digital clocks that include automatic alarms. These time function elements, which operate very precisely, have not as yet been applied in controlling and governing operations in the sphere of fluidics.

Finally, counter elements are utilized in fluidics which do not transmit a control signal to a post-connected system until after several actions counted as events at their input side.

It is an object of the invention to provide a switching mechanism for the preselectible preparation of fluidic output signals as control signals, which allows optional presetting of a time or event value, which, despite uncomplicated structure, allows a precise reproducible presetting of the onset as well as of the duration of the signals which are to be prepared, and assures these qualities for an extremely great number of hours of operation and may be operated on very low electrical power.

SUMMARY OF THE INVENTION

Accordingly, in a switching system of the kind herein above set forth, the invention consists in that:

(a) the electrical system includes a combined switchable timing or clock mechanism formed by a time function element which is of the transistor or quartz type and by a counter element;

(b) the clock mechanism has post-connected to it monostable multivibrator or sweep stage; and (c) the sweep stage is connected to a valve means including a storage member which is activatable by the transient control signal of the sweep stage for converting the electrical control signal of the clock mechanism into a fluidic output signal.

Thus, the invention provides a switching mechanism for fluidic switching actions, in particular for application in places endangered by explosions and by comparative risks which operates in a precisely timed manner as compared to existing switching mechanisms and is substantially reduced in its structural size. Thanks to the utilization of a time function element of the transistor or quartz type, switching precision is now obtained even in the sphere of fluidic control and governing, that is to say, regarding the timing behavior of the signals, in which connection it is possible to preset a period from milliseconds to 1,000 hours of operation and more, as well as in respect of chronological reproducibility of the signals which lies within the millisecond range, and may, for example, amount to 200 ms. Moreover, the preselection of the time is not affected by hysteresis and parallax. The possibility also exists of utilizing the switching mechanism even when the input signals are each received in the form of several pulses, since the clock mechanism may then be switched from the time function element to the counter element which passes onwards an internal control pulse following the preset number of events. Another advantage consists in the low consumption of electrical power needed to operate the switching mechanism, since no more than a brief electrical pulse of a few milliseconds is required for conjunctive switching of the valve means post-connected to the clock mechanism, which is then retained in the store of the valve means until the required instant. It is advantageous moreover that the valve means is integrated into the mechanism, so that the former need not be provided separately for the external fluid circuit of a machine, mechanism or the like, which is to be controlled.

If desired, the electrical components of the switching mechanism may be supplied from a disconnectible source of direct current which is connected to a solar cell. The switching mechanism is thus independent of the supply grid and may be operated in a power-saving manner.

BRIEF DESCRIPTION OF THE DRAWINGS

In order that the invention may be more clearly understood, references will now be made to the accompanying drawings, wherein:

FIG. 1 is a block diagram of a composite embodiment having an auxiliary connection;

FIG. 2 is a block diagram of an embodiment, without an auxiliary connection;

DETAILED DESCRIPTION OF A PREFERRED EMBODIMENT

Figure 3:
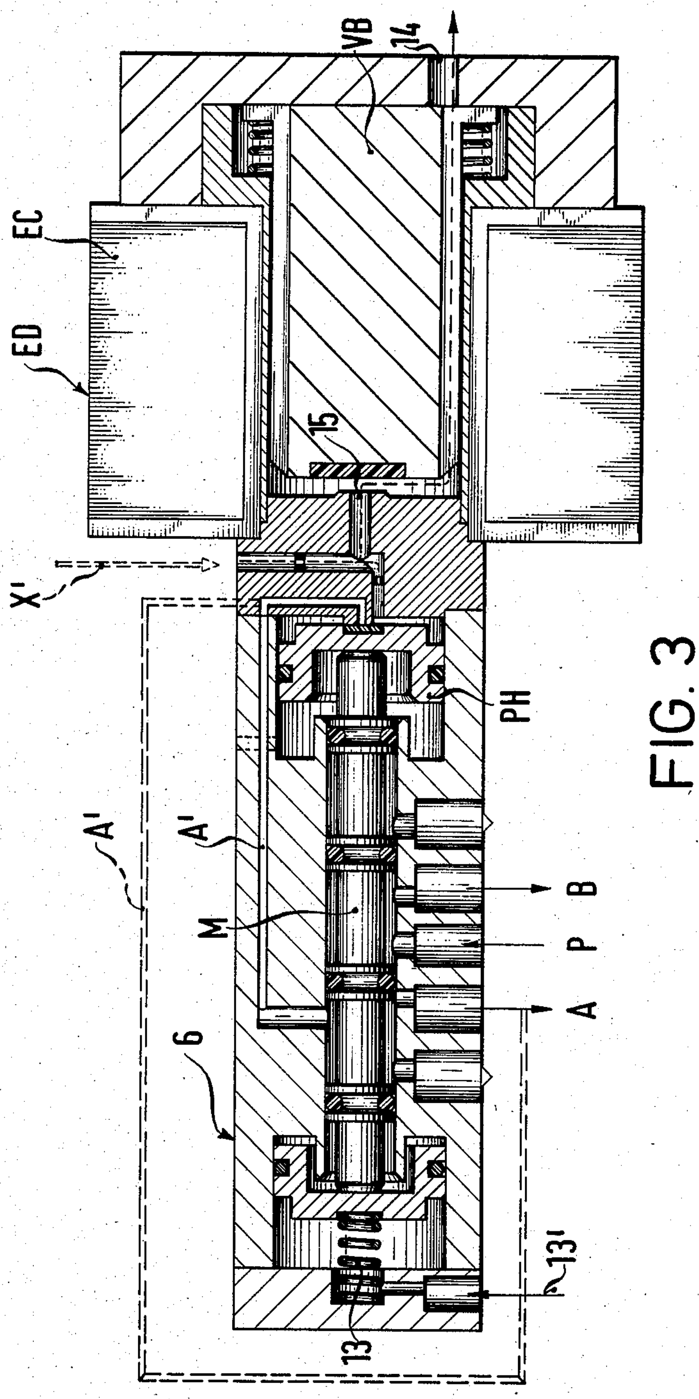
FIG. 3 is a block diagram of a second embodiment, having an auxiliary connection.

Referring now to FIGS. 1 and 2 in the drawings, the switching mechanism shown at 1 comprises a housing 2 with several components housed therein and connected to each other. These comprise a first converter or transformer 3 which converts fluidic input signals into electrical signals, an electrical system 4, post-connected to the latter, being a monostable sweep stage which is a monostable multivibrator 5 followed by valve means including an electrical actuating device 6 which is acted upon by the brief signal arriving from the sweep stage and is thereby caused to produce a conversion in its fluidic section. The electrical system 4 is a state of art device which, for example, is used in modern digital wrist watches. Similarly, the valve means 6 is a state of art device such as an electromagnetic pilot valve. The components operated by electric power are advantageously supplied from a source 7 of direct current, which may, for example, comprise a battery or an accumulator. This source may have wired to it a solar cell 7*a* so that the source 7 may be operated in a power-saving manner by the action of light. Alternatively, it is also possible to utilize a source of alternating current, the mechanism then commonly depending on a main power supply. The first converter or transformer 3, which is supplied with a control input signal from the connection X via an input pipe line 8, includes a switch 9 for closing a circuit so that the system 4 may be activated. Interposed between the multivibrator 5 and the valve means 6 is a combination electrical device ED and a pilot valve device PV. The electrical device ED activates the pilot valve device PV which is generally integrated in the valve means 6 and actuated by said electrical device ED thereby enabling a piston of the valve means 6 to be moved by an auxiliary fluid signal derived from P internally.

The auxiliary fluid signal carries out the storing function too by holding said piston in a new position. This is a basic connection (without A′ and X′) and is state of the art. FIG. 2 is similar to FIG. 1, except that it does not show use of the auxiliary connection X′.

The electrical system 4 includes a combined clock mechanism, which is formed by a time function element of the transistor or quartz type and by a counter element, and is switchable between these two elements. The system 4 comprises a preferably digitally indicating input facility 10 and another digital indicator or display 11 such that the system may be preset within a required timing range which may amount to 1,000 hours and more, the value of the display 11 altering during the count-down of the preset period or counter value. No more than one common display panel only may be provided moreover for presetting and indication. The system 4 is provided with a three-way principal switch 12 moreover, whereby the proposed switching mechanism may be switched on and off as well as the timing or counting mode.

The valve means 6 may be constructed in the form of a reversible fluid valve which comprises an electrical input section for placing the control piston of the valve means 6 in the required switching position. Furthermore, the valve means has a storing function which is so organized that the control piston is induced to assume a priority position by means of a spring 13. The meaning of the term storage function is that the piston in the valve means 6, once set, remains in its new state for a desired time period. Practically, this is achieved for instance by internally deriving a fluid signal from P (or A) and directing this signal to the piston. This is well known in the art.

The operation of the switching mechanism will now be described, while assuming that no more than the time function element of the electrical system 4 is in operation initially.

Let it be assumed that a fluid pressure which is available without attenuation at the outlet B of the valve means, prevails at the connector P of the valve means 6. If it is intended to alter this switching condition of the valve means or the switching state of the switching circuit which is connected thereto, and which does not appertain to the invention, a fluidic input signal is fed to the first converter or transformer 3 via the connector X of the switching mechanism. Said signal then activates the system 4 in the form of the time function element on which the required period had been preset on the input board 10. Once this period has elapsed, a control signal is fed to the multivibrator 5 from the time function element which, apart from the time constant of the sweep stage, is supplied immediately to the valve means 6 in the form of a brief pulse. During the switching period of the multivibrator 5, the valve means is activated, in such a manner that the electrical signal activates the storage member thereof. This cancels the priority position of the control piston in the valve means 6, and this piston is carried into its other switching position, this new position being retained for as long as the control signal is operative at the connection X. When this control input signal dies down, the store is returned to its original or initial condition, and the display 11 is reset to zero.

The operation of the switching mechanism will now be described under utilization of the counter element of the system 4, the time function element then being overbridged.

Let it be assumed that the initial state, as specified in connection with the time function element, is also operative for the valve means 6. This also applies for the first convertor or transformer 3. A number corresponding to the number of events arriving in the form of pulses is preset on the input board 10 of the system 4. The connector X of the switching mechanism then receives the fluidic pulses which are converted in the converter or transformer 3 into corresponding electrical pulses which for their part act on the counter element which may be read on the display 11. When the number of events preset on the input board 10 is reached on display 11, the multivibrator 5 is again acted upon by the output signal of the counter element, whereby the valve means 6 is acted upon as described in the foregoing, to operate in a corresponding manner. In this case too, when no other fluidic pulses are operative at the connector X, the valve means 6 as well as the counter element may be reset manually to their initial condition. Regarding this reset action, it is alternately also possible to effect this as a result of external signals or control pulses. This has been shown symbolically by 13′ at the valve means 6 in the drawings.

The operation of the valve means 6 may also be modified to the effect that auxiliary control conductors A′ and X′, starting from the connectors A and X, respectively, are provided for this purpose. In FIGS. 1 and 3 of the drawings, it is shown that an auxiliary connection is made from the connector X to an input X′ of the valve mean 6, as indicated by a broken line. Similarly, the connector A is connected, by a broken line indication, to an input A′ of the valve means 6. From this, it is seen that, if no auxiliary connections are made to X′ and A′, the full fluidic pressure in A and X is applied to the components in the housing 2. However, if it is desired to modify the effect of the fluidic pressure appearing in valve means 6, the auxiliary connections are made to A′ and X′ so that a differential pressure effect can be achieved in the valve means 6. This type of fluidic pressure modification is common for achieving pressure differential operation of the valve means 6 which has various outputs for connecting such modifying pressures.

A valve means appropriate for this operation and made in the form of a fluid valve, may comprise a differential piston. The priority or preferential position of the piston is assured in principle by the spring 13 unless the transient pulse coming from the multivibrator 5 and a pulse or the like arriving via the auxiliary conductor X′, act simultaneously on the differential piston. Upon switching the storage member including the differential piston in the valve means 6, that is to say, on the basis of a pulse from the multivibrator 5, another retaining pulse the value of which is lower, however, than that passing via the auxiliary conductor X′, is opposed simultaneously to the spring 13 via the auxiliary conductor A′. Accordingly, when the valve means 6 has been set, the force produced by the signals at X′ and A′ works against the spring 13 and thus stabilizes the set state of the valve means 6. If the control input signal is cancelled at the connector X, the signal at X′ in turn is also cancelled, and the then preponderant force of the spring 13 operates the return of the differential piston to its initial position. The storage member is vented at the same time via the auxiliary line A′. As explained above, the pulse or signal coming from the multivibrator 5 is only present for a short time, and sets the valve means 6 together with the signal at X′.

The second embodiment of the invention is shown specifically in FIG. 3. In this embodiment, the aforementioned auxiliary signal is replaced by a fluid signal X′ derived from the input signal X. However, signal X′ cannot initially move the piston head of the valve means 6 since it is vented through an aperture 14 to the atmosphere. But if the valve body VB of the pilot valve is actuated by the electromagnetic device ED, which in turn is actuated by the multivibrator 5, an internal opening 15 is closed, and now the piston head PH of the piston M in the member 6 moves to the left against the spring 13. Now, an output signal A is present.

Additionally present is a further auxiliary signal A′ which keeps the piston of the member 6 in the left position (storing function). This is necessary because the electrical coil EC in the electrical device ED is no longer energized (because the multivibrator 5 works only for a short time which is sufficient for moving the piston of the member 6) so that the valve body VB of the pilot valve opens with the result that the signal X′ now again vents to the atmosphere.

Resetting is carried out again by a signal through 13′ or by cancelling the signal P. In the latter case, spring 13 will reset the piston.

Figure 4:
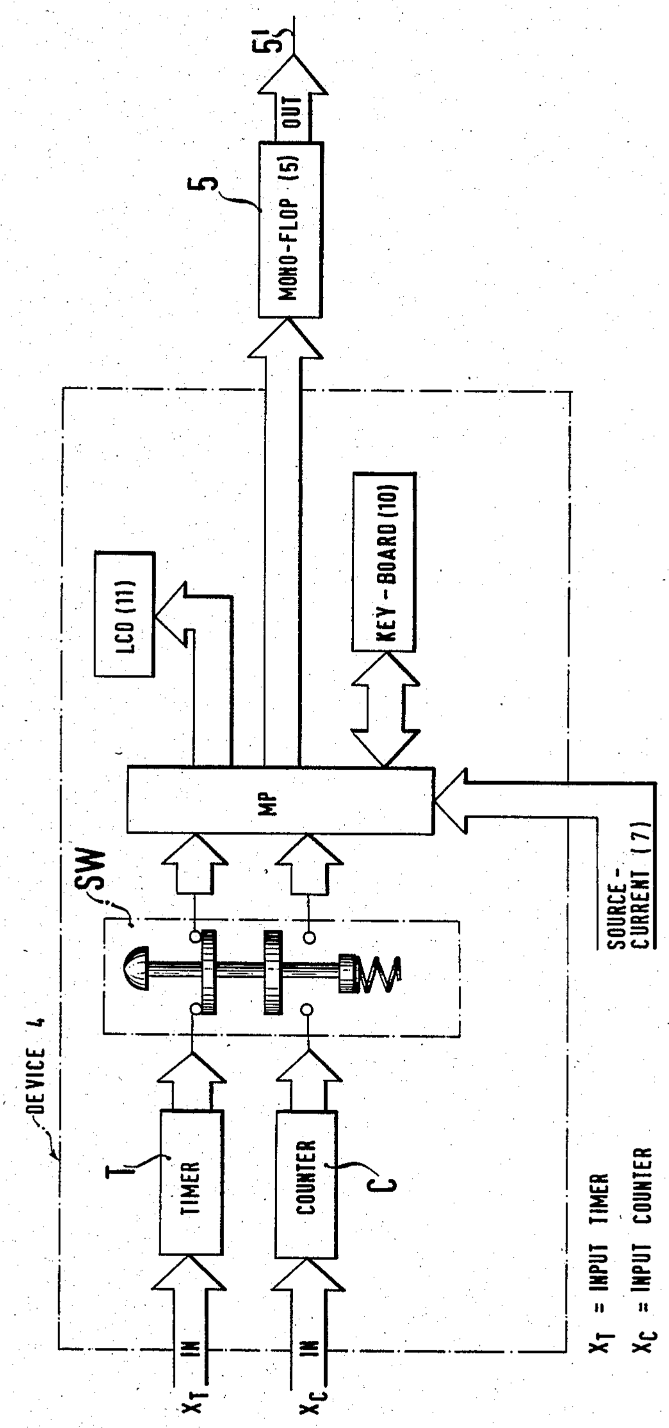
FIG. 4 is a block diagram of an electrical system used in the embodiments.

In FIG. 4, the block component 4 identifying the electrical system in FIG. 4 is shown in a greater detail. The electrical system 4 which includes the clock mechanism comprises a timer T (Time Function Element) and a counter C (Counter Element). The timer and counter are well known per se alone, but not in combination in one device as the applicant reports now. The combination is effected by the switch SW whereby the timer or the counter goes into operation in connection with a microprocessor MP with which the timer and counter work together.

In reference to FIG. 3, the signal X in line 8 (FIG. 1) is always necessary irrespective of whether the signal X′ is derived from X or from P. The reason for this is that the member 6 can only go into operation when it has got a pulse signal from the multivibrator 5 over the members 3 and 4, i.e., members 3 and 4 must be actuated over Line 8 by signal X. Only then the device 4 can give a delayed signal to the multivibrator 5 [on the basis of a presettable time delay (timer) or of a presettable sum of pulses (event value, counter)]. The signal 5′ therefore in turn actuates the electromagnetic device which later actuates the pilot valve. Now, signal X′ (or an equivalent from P) can move piston M to the left. When piston M has reached the left (set) state, now signal A′ (or an equivalent from P too) has become effective and holds the piston M in its set state (storing function). Since the signal from the multivibrator 5 is short, signal X′ (or the equivalent) is also short. The pilot valve opens then and signal X′ is no longer effective on piston M, but signal A′ (or the equivalent) is, and holds the piston M.

Only when signal P is cancelled, the piston M of the valve means 6 returns to its initial state because signal A′ too is cancelled and spring 13 becomes effective (or alternatively, signal 13′ becomes effective, irrespective of whether signal X in Line 8 is cancelled or not). As stated above, the signals X′ and A′ are derived from Line 8 and a signal line, respectively. The most important feature is that the electromagnetic device and the associated pilot valve of the valve means 6 now are actuated for a short time, e.g., for seconds or milliseconds. This is achieved by the monoflop 5′ shown in FIG. 4.

I claim:

1. In a switching mechanism for preparing fluidic output signals including, a first converter device having means for receiving fluidic input signals and converting them to corresponding output signals, and an electrical system having a time function element and a counter element, each of which has an input and an output, the time function element including means for emitting an output signal a selectable predetermined time after receiving an input signal, the counter element including means for emitting an output signal after a selected predetermined number of input signals, means for connecting the output of the first converter device to the inputs of the time function element and the counter element, switch means for selectively connecting either the output of the time function element or the counter element to an output of said electrical system, a multivibrator responsive to the output of said electrical system for producing a brief output signal, and valve means including an electrical actuating device responsive to said brief output signal of the multivibrator for producing a fluidic output signal.

2. An improved switching mechanism according to claim 1, wherein a disconnectible source of direct current is provided for the electrical components of said mechanism.

3. An improved switching mechanism according to claim 2, wherein a solar cell is co-ordinated with said source of direct current for the purpose of saving power.

4. An improved switching mechanism according to claim 1, wherein said actuating device is resettable in its initial state by cancelling the input signal acting on said first converter or by an external signal.

5. An improved switching mechanism according to claim 1, wherein said time function element is resettable into its initial state by cancelling the input signal acting on said first converter, or by an external output signal.

6. An improved switching mechanism according to claim 1, wherein said time function element is of the transistor type.

7. An improved switching mechanism according to claim 1, wherein said time function element is of the quartz type.

* * * * *

UNITED STATES PATENT OFFICE
CERTIFICATE OF CORRECTION

PATENT NO. : 4,567,913

DATED : February 4, 1986

INVENTOR(S) : Harald Klocke

It is certified that error appears in the above-identified patent and that said Letters Patent are hereby corrected as shown below:

On the title page, Item [63]:

After "Continuation-In-Part of Serial No. 553,864, Nov. 21, 1983, abandoned", insert --which in turn was a Continuation of Serial No. 280,921, July 6, 1981, abandoned--.

Signed and Sealed this

*Sixth* Day of *May 1986*

[SEAL]

*Attest:*

DONALD J. QUIGG

*Attesting Officer* *Commissioner of Patents and Trademarks*